United States Patent
Zhang et al.

(10) Patent No.: US 11,341,376 B2
(45) Date of Patent: May 24, 2022

(54) METHOD AND DEVICE FOR RECOGNIZING IMAGE AND STORAGE MEDIUM

(71) Applicant: BEIJING DAJIA INTERNET INFORMATION TECHNOLOGY CO., LTD., Beijing (CN)

(72) Inventors: Shuifa Zhang, Beijing (CN); Yan Li, Beijing (CN); Sibo Wang, Beijing (CN); Chang Liu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/910,716

(22) Filed: Jun. 24, 2020

(65) Prior Publication Data

US 2020/0320352 A1    Oct. 8, 2020

(30) Foreign Application Priority Data

Jun. 24, 2019   (CN) .......................... 201910550592.7

(51) Int. Cl.
*G06K 9/62*     (2022.01)
*G06V 10/25*    (2022.01)
*G06V 10/40*    (2022.01)

(52) U.S. Cl.
CPC .......... *G06K 9/6268* (2013.01); *G06V 10/25* (2022.01); *G06V 10/40* (2022.01)

(58) Field of Classification Search
None
See application file for complete search history.

(56) References Cited

U.S. PATENT DOCUMENTS

| | | | |
|---|---|---|---|
| 9,396,530 B2 | 7/2016 | Amirghodsi et al. | |
| 10,846,552 B1* | 11/2020 | Wu ...................... | G06F 16/583 |
| 2007/0201757 A1* | 8/2007 | Madej .................. | G06Q 20/208 |
| | | | 382/254 |
| 2016/0328630 A1* | 11/2016 | Han ...................... | G06K 9/6272 |
| 2019/0205694 A1* | 7/2019 | Wang .................. | G06K 9/00288 |
| 2020/0401854 A1* | 12/2020 | Peng .................... | G06K 9/6257 |
| 2021/0012508 A1* | 1/2021 | Porcel Magnusson ... | G06T 7/11 |

FOREIGN PATENT DOCUMENTS

| | | |
|---|---|---|
| CN | 106355188 A | 1/2017 |
| CN | 106557778 A | 4/2017 |
| CN | 107590489 A | 1/2018 |
| CN | 107886481 A | 4/2018 |
| CN | 108629279 A | 10/2018 |
| CN | 108764313 A | 11/2018 |
| CN | 109117810 A | 1/2019 |
| CN | 109242801 A | 1/2019 |
| WO | 2017079522 A1 | 11/2017 |

* cited by examiner

*Primary Examiner* — Oneal R Mistry
*Assistant Examiner* — Nicolas James Boyajian
(74) *Attorney, Agent, or Firm* — Meunier Carlin & Curfman LLC

(57) ABSTRACT

A method and device for recognizing an image, electronic equipment and a storage medium are provided. The method includes: acquiring an image to be recognized; determining a potential recognition region based on a target algorithm model; determining an up-sampled potential recognition region by up-sampling the potential recognition region; and determining a classification recognition result based on the up-sampled potential recognition region.

13 Claims, 3 Drawing Sheets

METHOD AND DEVICE FOR RECOGNIZING IMAGE AND STORAGE MEDIUM

CROSS REFERENCE TO RELATED APPLICATIONS

This application is based on and claim priority under 35 U.S.C. 119 to Chinese Patent application No. 201910550592.7, filed on Jun. 24, 2019, in the China National Intellectual Property, the disclosures of which is herein incorporated by reference in its entirety.

FIELD

The disclosure relates to the technical field of image processing, in particular to a method and device for recognizing an image and a storage medium.

BACKGROUND

With the development of computer vision technology, character recognition in images becomes possible. After the advent of neural network, the technology of character recognition in images has been developed rapidly. In related art, normal-sized characters can be effectively recognized through the computer vision technology, however, the recognition success rate is low for small-sized characters, e.g. characters with the pixel being smaller than 16*16.

SUMMARY

According to a first aspect of an embodiment of the disclosure, a method for recognizing an image is provided. The method includes:
  acquiring an image to be recognized;
  determining a potential recognition region of the image based on a target algorithm model, wherein the potential recognition region includes a region with a designated content and a size no greater than a preset threshold;
  determining an up-sampled potential recognition region by up-sampling the potential recognition region; and
  determining a classification recognition result based on the up-sampled potential recognition region.

According to an embodiment of the disclosure, the target algorithm model includes a feature extraction network, a region proposal network and a region pooling network.

According to an embodiment of the disclosure, said determining the potential recognition region includes:
  determining a first feature map by extracting features from the image based on the feature extraction network;
  determining a first predict bounding box based on the first feature map and the region proposal network, wherein the first predict bounding box includes a target feature region;
  determining a target recognition result based on the first feature map and the target feature region;
  determining the potential recognition region based on the target recognition result.

According to an embodiment of the disclosure, the target recognition result includes: the target feature region includes no potential recognition region; the target feature region includes potential recognition region.

According to an embodiment of the disclosure, the target recognition result includes: a position of the potential recognition region and a classification recognition result of regions other than the potential recognition region in the target feature region in response to that the target feature region includes potential recognition region.

According to an embodiment of the disclosure, said determining the potential recognition region based on the target recognition result includes: extracting the potential recognition region from the image in response to that the target feature region includes potential recognition region.

According to an embodiment of the disclosure, said determining the classification recognition result includes:
  determining a second feature map by extracting features from the up-sampled potential recognition region based on the feature extraction network;
  determining a second predict bounding box based on the second feature map and the region proposal network, wherein the second predict bounding box includes a specified feature region; and
  determining the classification recognition result based on the region pooling network and the specified feature region.

According to an embodiment of the disclosure, said the target algorithm model is pre-trained by:
  acquiring sample images;
  determining labeled sample images by labeling designated contents and potential recognition regions in the sample images; and
  obtaining the target algorithm model by training an initial algorithm model based on the labeled sample images.

According to a second aspect of an embodiment of the disclosure, a device for recognizing an image is provided. The device includes: a processor; and a memory configured to store instructions executable by the processor; wherein the processor is configured to execute the instructions to: acquire an image to be recognized; determine a potential recognition region of the image based on a target algorithm model, wherein the potential recognition region includes a region with a designated content and a size no greater than a preset threshold; determine an up-sampled potential recognition region by up-sample the potential recognition region; and determine a classification recognition result based on the up-sampled potential recognition region.

According to an embodiment of the disclosure, the target algorithm model includes a feature extraction network, a region proposal network and a region pooling network.

According to an embodiment of the disclosure, the processor is configured to:
  determine a first feature map by extracting features from the image based on the feature extraction network;
  determine a first predict bounding box based on the first feature map and the region proposal network, wherein the first predict bounding box includes a target feature region;
  determine a target recognition result based on the region pooling network and the target feature region;
  determine the potential recognition region based on the target recognition result.

According to an embodiment of the disclosure, the target recognition result includes: the target feature region includes no potential recognition region; the target feature region includes the potential recognition region.

According to an embodiment of the disclosure, the target recognition result includes: a position of the potential recognition region and a classification recognition result of regions other than the potential recognition region in the target feature region in response to that the target feature region includes potential recognition region.

According to an embodiment of the disclosure, the processor is configured to: extract the potential recognition region from the image in response to that the target feature region includes potential recognition region.

According to an embodiment of the disclosure, the processor is configured to:

determine a second feature map by extracting features from the up-sampled potential recognition region based on the feature extraction network;

determine a second predict bounding box based on the second feature map and the region proposal network, wherein the second predict bounding box includes a specified feature region; and determine the classification recognition result based on the region pooling network and the specified feature region.

According to an embodiment of the disclosure, the target algorithm model is pre-trained by:

acquiring sample images;

determining labeled sample images by labeling the designated contents and potential recognition regions in the sample images; and obtaining the target algorithm model by training an initial algorithm model based on the labeled sample images.

According to a third aspect of an embodiment of the disclosure, a computer readable storage medium is provided. The computer readable storage medium stores computer programs that, when executed by a processor, cause the processor to perform the operation of: acquiring an image to be recognized; determining a potential recognition region of the image based on a target algorithm model, wherein the potential recognition region includes a region with a designated content and a size no greater than a preset threshold; determining an up-sampled potential recognition region by up-sampling the potential recognition region; and determining a classification recognition result based on the up-sampled potential recognition region.

BRIEF DESCRIPTION OF THE DRAWINGS

In order to more clearly illustrate technical solutions in embodiments of the disclosure or in the prior art, a brief introduction will be given below on accompanying drawings which need to be used in the description of the embodiments or the prior art. Apparently, the accompanying drawings described below are merely some embodiments of the disclosure.

Those skilled in the art can obtain other accompanying drawings according to these drawings without any creative effort.

DETAILED DESCRIPTION

In order to make those skilled in the art better understand the technical solutions of the disclosure, a clear and complete description will be given below on the technical solutions in the embodiments of the disclosure in combination with accompanying drawings.

It should be noted that, the terms "first", "second" and the like in the specification, the claims and the above drawings in the disclosure are used to distinguish similar objects and not to describe a particular order or sequence. It should be understood that the data such used can be interchangeable under appropriate conditions, so that the embodiments of the disclosure described herein can be implemented in a sequence other than those illustrated or described herein. The embodiments described in the following exemplary embodiments do not represent all the embodiments consistent with the disclosure. Instead, they are merely examples of devices and methods which are consistent with some aspects of the disclosure as detailed in the attached claims.

Figure 1:
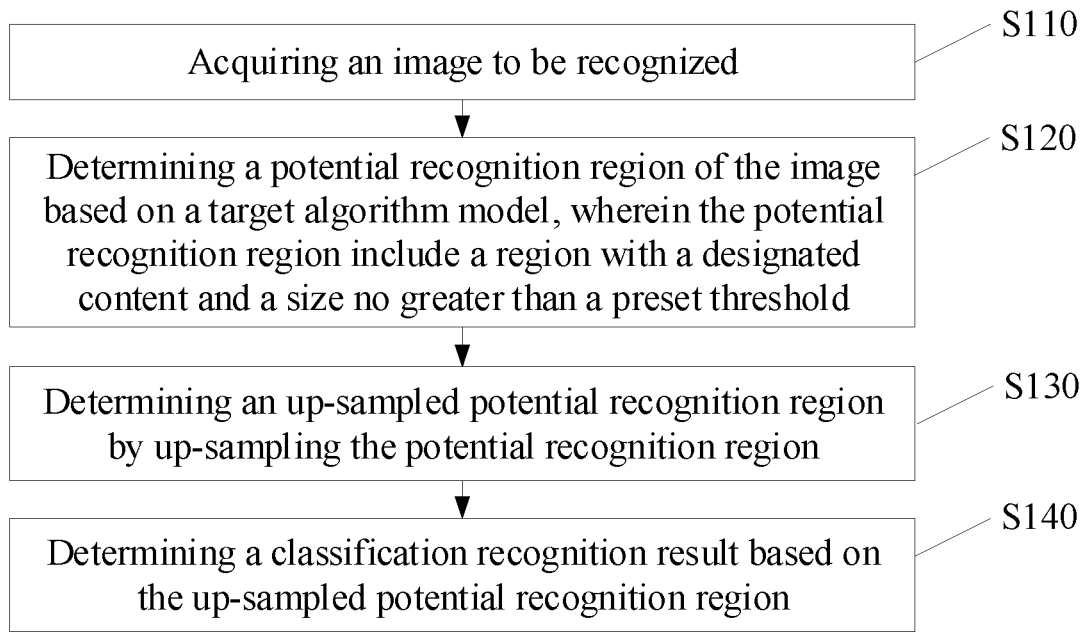
FIG. 1 is a first schematic diagram of a method for recognizing an image according to an embodiment of the disclosure.

In order to improve success rate of recognition of small objects in the image, an embodiment of the disclosure provides a method for recognizing an image. The image method of the embodiment of the disclosure can be performed by an electronic equipment, and the electronic equipment can be a server or a smart phone, etc. Refer to FIG. 1, and the method includes the following steps.

S110: acquiring an image to be recognized.

The electronic equipment acquires an image to be recognized, and can further adjust the image to be a preset resolution in response to that the resolution of the image is not the preset resolution. The preset resolution is an input resolution of the target algorithm model in S102, and is set according to requirements of an actual target algorithm model.

S120: determining a potential recognition region of the image based on a target algorithm model, wherein the potential recognition region includes a region with a designated content and a size no greater than a preset threshold.

The image is input to the target algorithm model to determine the potential recognition region of the image. The target algorithm is pre-trained.

The designated content refers to the content to be recognized. For example, when the content to be recognized is a character, then the designated content is a character; and when the content to be recognized is a vehicle, then the designated content is a vehicle. The size of the preset threshold can be set according to actual conditions, for example, the size of the preset threshold can be set to 12*12, 16*16 or 24*24, etc.

The potential recognition region is a region, including a designated content and being of a size no greater than a preset threshold, in the image. For example, the potential recognition region may be a small-sized character in the image.

S130: determining an up-sampled potential recognition region by up-sampling the potential recognition region. The electronic equipment up-samples the potential recognition region, and scales to a preset resolution.

S140: determining a classification recognition result based on the up-sampled potential recognition region. In this step, a classification recognition result is determined by analyzing the up-sampled potential recognition region based on target algorithm model.

The classification recognition result is the recognition result of the designated content. For example, when the designated content is a character, the classification recognition result is the character recognition result; and when the designated content is a human face, then the classification recognition result is the human face recognition result, etc.

In the above method, the potential recognition region in the image is up-sampled, and then a classification recognition result is obtained by recognizing the up-sampled potential recognition region based on the target algorithm model. Thus, the success rate of recognition of small objects is improved.

In some embodiments, the target algorithm model is pre-trained. The target algorithm model may include a feature extraction network, a region proposal network, and a region pooling network.

Figure 2:
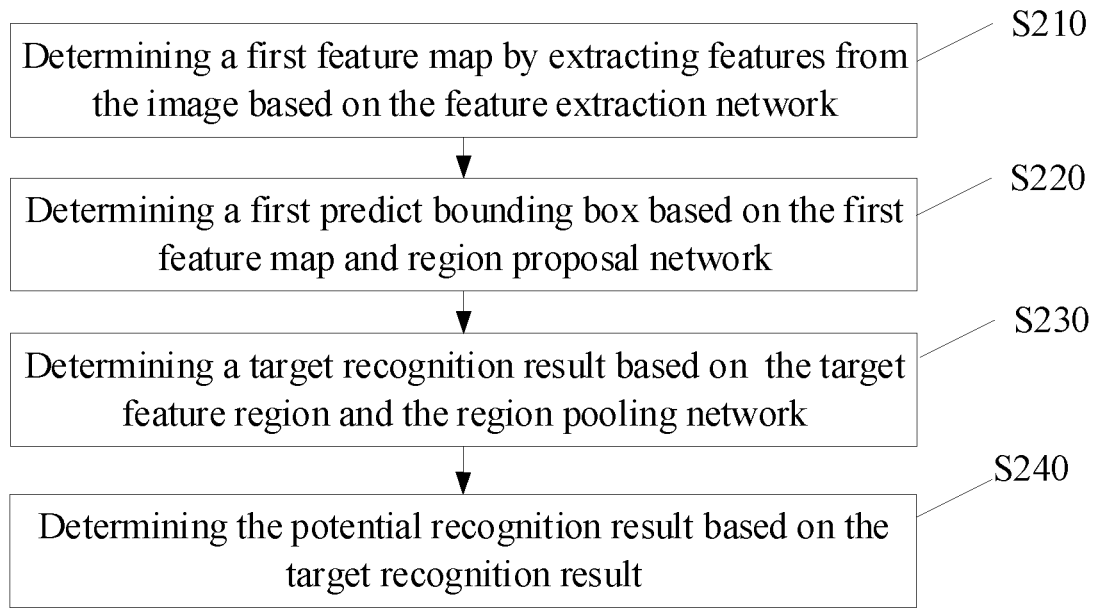
FIG. 2 is a second schematic diagram of a method for recognizing an image according to an embodiment of the disclosure.

In some embodiments, referring to FIG. 2, the potential recognition region is determined. In S210, a first feature map is obtained by extracting features from the image based on the feature extraction network of the target algorithm model.

In S220, a first predict bounding box is determined based on the first feature map and the region proposal network of the target algorithm model. The electronic device obtains the first predict bounding box of the first feature map by analyzing the first feature map based on the region proposal network of the target algorithm model. For example, classification and bounding box regression can be performed on the first feature map based on the region proposal network of the target algorithm model, and then NMS (Non-Maximum Suppression) is performed according to a result of classification and bounding box regression, to obtain the first predict bounding box.

In S230, a target recognition result is determined based on the region pooling network and the target feature region in the first predict bounding box.

The electronic device determines the target recognition result of a target feature region by analyzing the target feature region in the first predict bounding box of the first feature map based on the region pooling network of the target algorithm model. The target recognition result includes: the target feature region includes no potential recognition region, the target feature region includes the potential recognition region.

In S240, the potential recognition region is determined based on the target recognition result.

The electronics device extracts the potential recognition region from the image in response to that the target feature region includes the potential recognition region.

In some embodiments, in response to that the target feature region includes the potential recognition region, the target recognition result may include a position of the potential recognition region in the target feature region.

In some embodiments, in addition to the recognition of a potential recognition region, the target algorithm model can further recognize the classification, such as the character, vehicle, etc. In response to that the target feature region includes the potential recognition region, the target recognition result of the target feature region includes a position of the potential recognition region in the target feature region and a classification recognition result of regions other than the potential recognition region in the target feature region.

In some embodiments, when there is no potential recognition region in the target recognition result, that is, the target recognition result only includes the classification result of the target feature region, it indicates all contents in the target feature region have been recognized.

Figure 3:
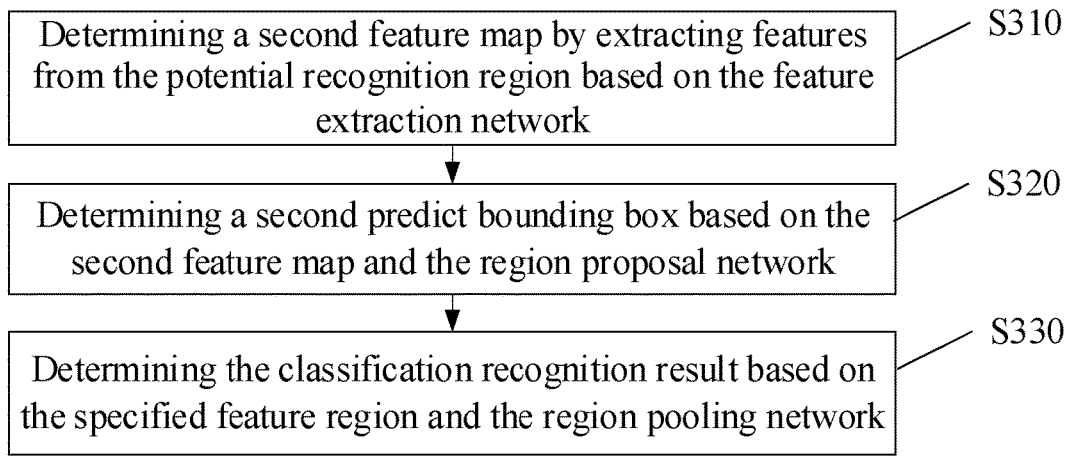
FIG. 3 is a third schematic diagram of a method for recognizing an image according to an embodiment of the disclosure.

In some embodiments, referring to FIG. 3, the classification recognition result of the potential recognition region is determined based on the up-sampled potential recognition region.

In S310, a second feature map is determined by extracting features from the up-sampled potential recognition region based on the feature extraction network of the target algorithm model.

In S320, a second predict bounding box is determined based on the second feature map and the region proposal network of the target algorithm model.

The second predict bounding box of the second feature map is determined by analyzing the second feature map based on the region proposal network of the target algorithm model. Classification and bounding box regression are performed on the second feature map based on the region proposal network of the target algorithm model, and then NMS is performed according to a result of classification and bounding box regression, to determine a second predict bounding box.

In S330, the classification recognition result is determined based on a specified feature region in the second predict bounding box and the region pooling network of the target algorithm model. The specified feature region is designated based on the second predict bounding box, and the classification recognition result of the specified feature region is the classification recognition result of the potential recognition region.

The recognition result of the specified feature region is determined by analyzing the specified feature region in the second predict bounding box based on the region pooling network of the target algorithm model, wherein the recognition result of the specified feature region includes the classification recognition result.

In some embodiments, when the recognition result of the specified feature region further includes the potential recognition region in the specified feature region, then a new potential recognition region can be extracted from the up-sampled potential recognition region, and the new potential recognition region can be input into a target algorithm model for analysis, until the recognition result output by the target algorithm model is that the target feature region includes no potential recognition region. Then small objects are detected recursively, thereby having a good adaptability on the small objects of different scales.

The target algorithm model has two functions: extracting potential recognition region and recognizing image. In some embodiments, the target algorithm model is pre-trained by the following process.

Step 1: acquiring sample images.

Step 2: determining labeled sample images by labeling designated contents and potential recognition regions in the sample images.

After a sample image is acquired, a potential recognition region in the sample image and the designated content in the sample image are labeled. For example, when groundtruth is labeled, besides normal labeling, the region including a designated object and with the size no greater than a preset threshold is labeled as a potential groundtruth of the current scale, and this is to increase fault tolerance.

Step 3: obtaining the target algorithm model by training an initial algorithm model based on the labeled sample images.

The labeled sample images are input into an initial algorithm model for training. After the result converges or the number of input samples reaches a preset number, the trained target algorithm model is obtained. The initial algorithm model can be fasterrcnn (Regions with Convolutional Neural Networks), yolo (You Only Look Once), SSD (Single Shot MultiBox Detector), rfcn (Region-based Fully Convolutional Networks) or cascade rcnn, etc.

In the embodiment of the disclosure, a potential recognition region is acquired, and the potential recognition region is up-sampled, and further the classification recognition result of the potential recognition region is obtained, thereby improving success rate of recognition of small objects. Moreover, the classification and the potential recognition region can be both recognized based on the same target algorithm model, thereby effectively reducing calculation amount, and greatly lowering complexity of the target algorithm model.

Figure 4:
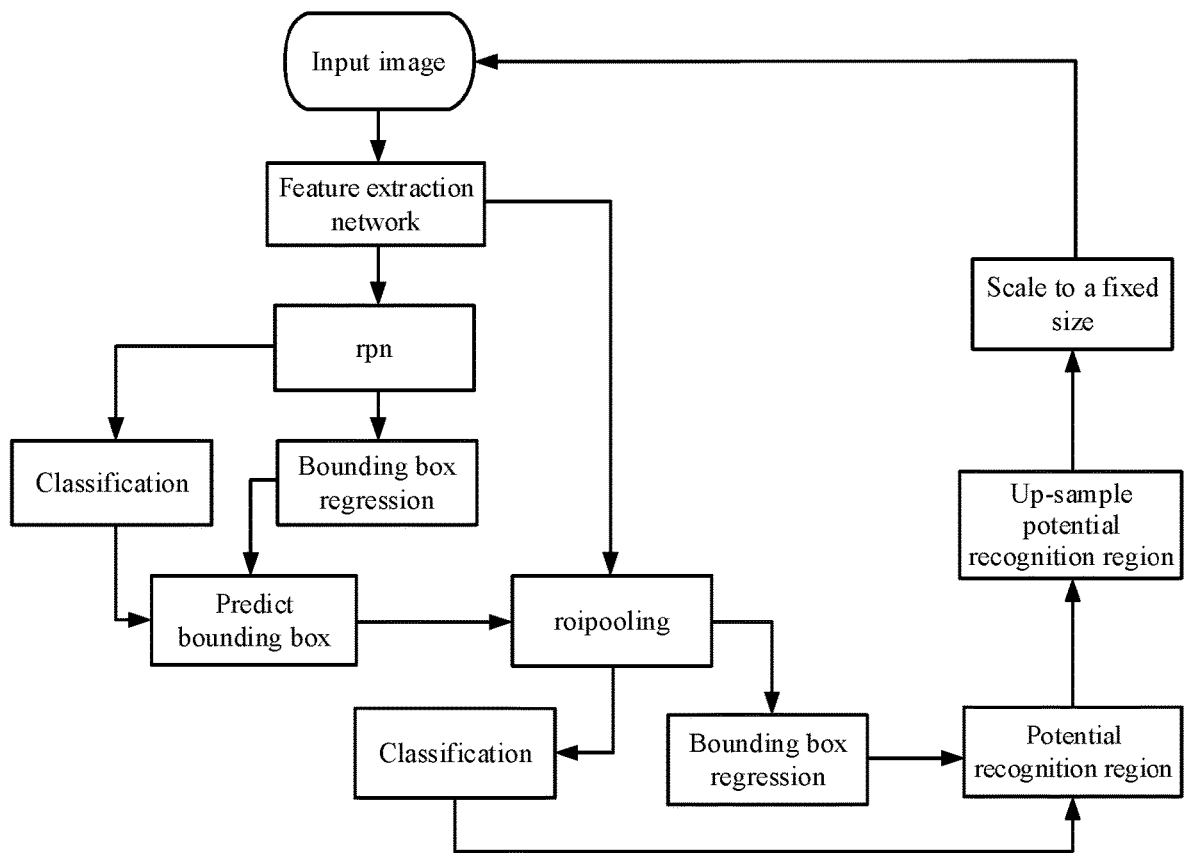
FIG. 4 is a fourth schematic diagram of a method for recognizing an image according to an embodiment of the disclosure.

Referring to FIG. 4, a two-stage fasterrcnn is taken as an example below to illustrate the method of the embodiment of the disclosure.

The image to be recognized is scaled to a preset resolution, and is input into a feature extraction network of the target algorithm model to obtain a feature map. The feature extraction network can be VGG16, InceptionV1, InceptionV2, resnet or Inception-resnet, etc.

The feature map is input into an RPN (Region Proposal Network) to perform classification and bounding box regression, and NMS is performed according to a result of classification and bounding box regression to obtain a predict bounding box.

A target feature region is intercepted in the feature map by using a predict bounding box, the target feature region is input into an ROI (Region of Interest)-pooling layer, and classification and bounding box regression are performed to obtain a recognition result. The recognition result includes the position of the potential recognition region in the target feature region and a classification recognition result of regions other than the potential recognition region in the target feature region.

The potential recognition region is intercepted from the image to be recognized. The potential recognition region is up-sampled and is input into a target algorithm model again for re-detection to obtain a recognition result; and detection is repeated until no potential recognition region is detected. In some embodiments, the potential recognition region is up-sampled and scaled to a fixed size, and then input into the target algorithm model again.

Figure 5:
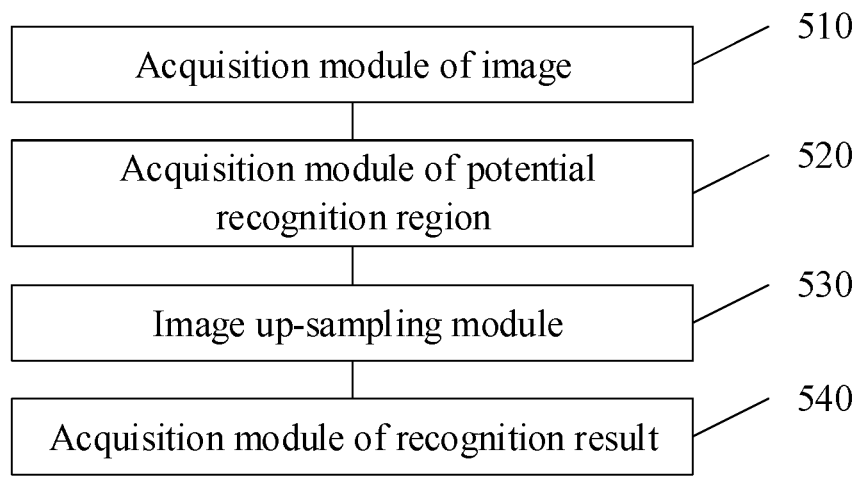
FIG. 5 is a schematic diagram of a device for recognizing an image according to an embodiment of the disclosure.

The embodiment of the disclosure further provides a device for recognizing an image. Referring to FIG. 5, the device includes:

an acquisition module of image 510, configured to acquire an image to be recognized;

an acquisition module of potential recognition region 520, configured to determine a potential recognition region of the image based on a target algorithm model, wherein the potential recognition region includes a region with a designated content and a size no greater than a preset threshold;

an image up-sampling module 530, configured to determine an up-sampled potential recognition region by up-sampling the potential recognition region; and an acquisition module of recognition result 540, configured to determine a classification recognition result based on the up-sampled potential recognition region.

In some embodiments, the target algorithm model includes a feature extraction network, a region proposal network and a region pooling network.

In some embodiments, the acquisition module of potential recognition region 520 is configured to: determine a first feature map by extracting features from the image based on the feature extraction network; determine a first predict bounding box based on the first feature map and the region proposal network, wherein the first predict bounding box includes a target feature region; determine a target recognition result based on the region pooling network and the target feature region; and determine the potential recognition region based on the target recognition result.

The target recognition result includes: the target feature region includes no potential recognition region, the target feature region includes the potential recognition region.

In some embodiments, the target recognition result includes a position of the potential recognition region and a classification recognition result of regions other than the potential recognition region in the target feature region in response to that the target feature region includes the potential recognition region.

In some embodiments, the acquisition module of potential recognition region 520 is configured to extract the potential recognition region from the image in response to that the target feature region includes the potential recognition region.

In some embodiments, the acquisition module of recognition result 540 is configured to: determine a second feature map by extracting features from the up-sampled potential recognition region based on the feature extraction network; determine a second predict bounding box based on the second feature map and the region proposal network; and determine the classification recognition result based on the region pooling network and the specified feature region.

In some embodiments, the target algorithm model is pre-trained as follows. The sample images are acquired, the designated contents and potential recognition regions are labeled in the sample images; and the labeled sample images are input into an initial algorithm model for training, to obtain a pre-trained target algorithm model.

Figure 6:
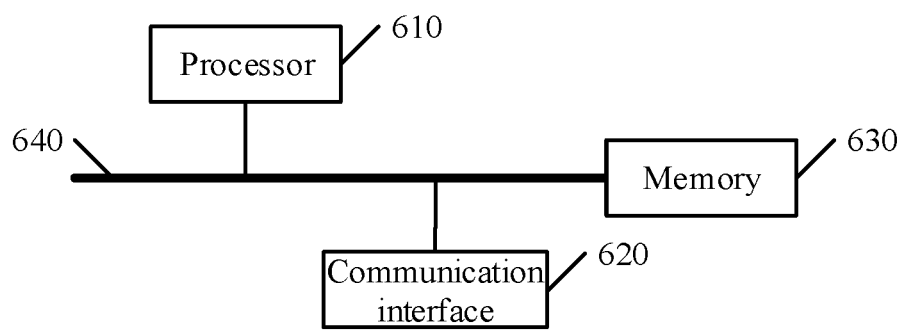
FIG. 6 is a schematic diagram of an electronic equipment according to an embodiment of the disclosure.

The embodiment of the disclosure further provides an electronic equipment. Referring to FIG. 6, the electronic equipment includes a processor 610 and a memory 630. The memory 630 is configured to store computer programs. The processor 610 is configured to executes computer programs stored in the above memory implement the following steps: acquiring an image to be recognized; determining a potential recognition region of the image based on a target algorithm model, wherein the potential recognition region includes a region with a designated content and a size no greater than a preset threshold; determine an up-sampled potential recognition region by up-sampling the potential recognition region; and determining a classification recognition result based on the up-sampled potential recognition region.

In some embodiments, referring to FIG. 6, the electronic equipment further includes a communication interface 620 and a bus 640, wherein the processor 610, the communication interface 620 and the memory 630 communicate with each other through a bus 640.

In some embodiments, the processor 610 can further implement any of the methods when the processor 610 executes computer programs stored in the memory 630.

The bus 640 in the above electronic equipment can be a PCI (Peripheral Component Interconnect) bus or an EISA (Extended Industry Standard Architecture) bus, etc. The communication bus can be divided into an address bus, a data bus, a control bus, etc. To facilitate representation, only a bold line is used in the figure to represent, but it does not mean the existence of only one bus or one type of bus.

The communication interface 620 is used for communication between the electronic equipment and other devices.

The memory 630 can include an RAM (Random Access Memory), and can also include an NVM (Non-Volatile Memory), for example, at least one disk memory. Optionally, the memory can also be at least one storage device arranged far away from the above-mentioned processor.

The above processor can be a general-purpose processor, including a CPU (Central Processing Unit), and an NP (Network Processor), etc.; and can also be a DSP (Digital Signal Processor), an ASIC (Application Specific Integrated Circuit), an FPGA (Field-Programmable Gate Array), or other programmable logic devices, discrete gates or transistor logic devices, and discrete hardware components.

The embodiment of the disclosure further provides a computer readable storage medium. The computer readable storage medium stores computer programs that, when executed by a processor, cause the processor to perform the following steps: acquiring an image to be recognized; determining a potential recognition region of the image based on a target algorithm model, wherein the potential recognition region includes a region with a designated content and a size no greater than a preset threshold; determine an up-sampled potential recognition region by up-sampling the potential recognition region; and determining a classification recognition result based on the up-sampled potential recognition region.

In some embodiments, the computer programs can perform any of the above methods when the computer programs are executed by a processor.

The embodiment of the disclosure further provides a computer program product, and the computer program product that, when executed by a processor, cause the processor to perform the following steps: acquiring an image to be recognized; determining a potential recognition region of the image based on a target algorithm model, wherein the potential recognition region includes a region with a designated content and a size no greater than a preset threshold; determine an up-sampled potential recognition region by up-sampling the potential recognition region; and determining a classification recognition result based on the up-sampled potential recognition region.

In some embodiments, the above computer program product can perform any of the above methods when the computer program product is executed by a processor.

Each embodiment in the present specification is described in a relevant way, and the same and similar parts of each embodiment can be referred to each other. Each embodiment focuses on the differences with other embodiments. In particular, for embodiments of devices, electronic equipment and storage media, since they are basically similar to method embodiments, the description is relatively simple, and the relevant aspects can be referred to part of the description of the method embodiments.

Those skilled in the art will easily conceive of other embodiments of the disclosure after considering the specification and practicing the invention disclosed herein. The disclosure aims at covering any variation, application or adaptive modification of the disclosure, and these variations, applications or adaptive changes follow the general principles of the disclosure and include common knowledge or customary technical means in the technical field not disclosed in the disclosure. Specifications and embodiments are considered exemplary only, and the true scope and spirit of the disclosure are indicated by the claims below.

It should be understood that, the disclosure is not limited to the precise structure described above and shown in the accompanying drawings, and various modifications and variations can be made without departing from the scope off the disclosure. The scope of the disclosure is limited only by the attached claims.

What is claimed is:

1. A method for recognizing an image, comprising:
acquiring an image to be recognized;
determining a first region of the image based on a target algorithm model, wherein the first region comprises a region with a designated content and a size no greater than a preset threshold;
determining an up-sampled first region by up-sampling the first region; and
determining a classification recognition result based on the up-sampled first region;
wherein the target algorithm model comprises a feature extraction network, a region proposal network and a region pooling network;
wherein said determining the classification recognition result comprises:
determining a second feature map by extracting features from the up-sampled first region based on the feature extraction network;
determining a second predict bounding box based on the second feature map and the region proposal network, wherein the second predict bounding box comprises a specified feature region; and
determining the classification recognition result based on the region pooling network and the specified feature region.

2. The method of claim 1, wherein said determining the first region comprises:
determining a first feature map by extracting features from the image based on the feature extraction network;
determining a first predict bounding box based on the first feature map and the region proposal network, wherein the first predict bounding box comprises a target feature region;
determining a target recognition result based on the region pooling network and the target feature region;
determining the first region based on the target recognition result.

3. The method of claim 2, wherein the target recognition result comprises:
the target feature region comprises no first region;
the target feature region comprises the first region.

4. The method of claim 3, wherein the target recognition result comprises a position of the first region and a classification recognition result of a second region different from the first region in response to that the target feature region comprises the first region; wherein the second region is a region other than the first region in the target feature region.

5. The method of claim 3, wherein said determining the first region based on the target recognition result comprises:
extracting the first region from the image in response to that the target feature region comprises the first region.

6. The method of claim 1, wherein the target algorithm model is pre-trained by:
acquiring sample images;
determining labeled sample images by labeling designated contents and first regions in the sample images; and
obtaining the target algorithm model by training an initial algorithm model based on the labeled sample images.

7. A device for recognizing an image, comprising:
a processor; and
a memory configured to store instructions executable by the processor;
wherein the processor is configured to execute the instructions to:
acquire an image to be recognized;

determine a first region of the image based on a target algorithm model, wherein the first region comprises a region with a designated content and a size no greater than a preset threshold;

determine an up-sampled first region by up-sampling the potential recognition region; and determine a classification recognition result based on the up-sampled potential recognition region;

wherein the target algorithm model comprises a feature extraction network, a region proposal network and a region pooling network;

wherein the processor is configured to:

determine a second feature map by extracting features from the up-sampled first region based on the feature extraction network;

determine a second predict bounding box based on the second feature map and the region proposal network, wherein the second predict bounding box comprises a specified feature region; and determine the classification recognition result based on the region pooling network and the specified feature region.

8. The device of claim 7, wherein the processor is configured to:

determine a first feature map by extracting features from the image based on the feature extraction network;

determine a first predict bounding box based on the first feature map and the region proposal network, wherein the first predict bounding box comprises a target feature region;

determine a target recognition result based on the region pooling network and the target feature region;

determine the first region based on the target recognition result.

9. The device of claim 8, wherein the target recognition result comprises:

the target feature region comprises no first region;

the target feature region comprises the first region.

10. The device of claim 9, the target recognition result comprises a position of the first region and a classification recognition result of a second region different from the first region in response to that the target feature region comprises the first region; wherein the second region is a region other than the first region in the target feature region.

11. The device of claim 9, wherein the processor is configured to:

extract the first region from the image in response to that the target feature region comprises the first region.

12. The device of claim 7, wherein the target algorithm model is pre-trained by:

acquiring sample images;

determining labeled sample images by labeling the designated contents and first regions in the sample images; and obtaining the target algorithm model by training an initial algorithm model based on the labeled sample images.

13. A computer readable storage medium storing computer programs that, when executed by a processor, cause the processor to perform the operation of:

acquiring an image to be recognized;

determining a first region of the image based on a target algorithm model, wherein the first region comprises a region with a designated content and a size no greater than a preset threshold;

determining an up-sampled first region by up-sampling the first region; and determining a classification recognition result based on the up-sampled first region;

wherein the target algorithm model comprises a feature extraction network, a region proposal network and a region pooling network;

wherein the processor is configured to:

determine a second feature map by extracting features from the up-sampled first region based on the feature extraction network;

determine a second predict bounding box based on the second feature map and the region proposal network, wherein the second predict bounding box comprises a specified feature region; and determine the classification recognition result based on the region pooling network and the specified feature region.

* * * * *